Sept. 28, 1954  FRANK HIDEO FUJITA  2,690,341
PICKING CART
Filed Oct. 14, 1952
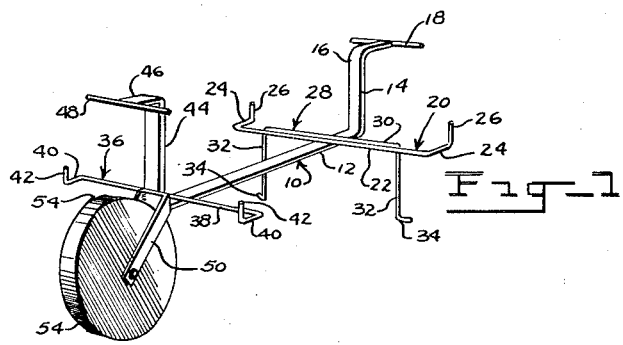
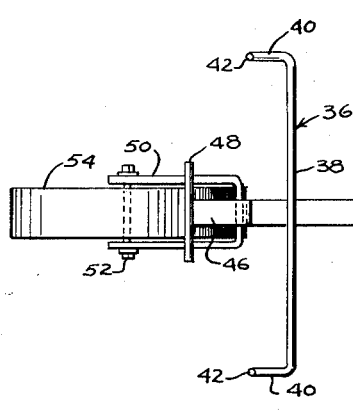
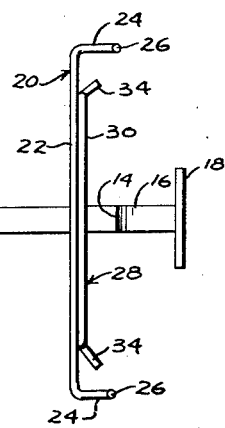
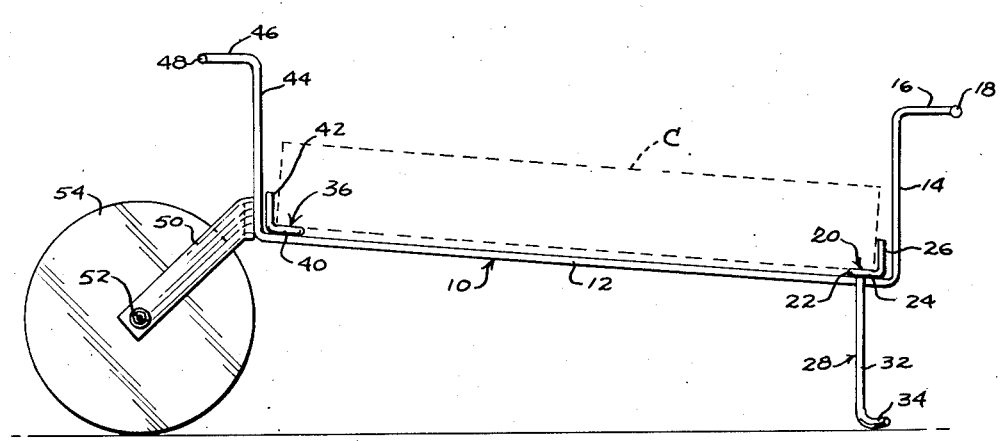
INVENTOR.
FRANK H. FUJITA
BY
McMorrow, Berman & Davidson
ATTORNEYS Patented Sept. 28, 1954

2,690,341

UNITED STATES PATENT OFFICE 2,690,341

PICKING CART

Frank Hideo Fujita, Watsonville, Calif.

Application October 14, 1952, Serial No. 314,719

2 Claims. (Cl. 280—47.3)

This invention relates to picking carts, and more particularly, has reference to a cart particularly, but not necessarily, adapted to facilitate the picking and the packing of berries.

The present invention is intended to provide an improved picking cart of the type disclosed in my previous patent, No. 2,578,793, issued December 18, 1951.

In the picking of berries, the picker is generally provided with a cart, on which a crate is positioned, the picker moving the cart along the ditch generally provided between the rows of plants. It is essential, in this connection, that the cart be light, so as to prevent the ground wheel of the cart from sinking too deeply into the soft ground on which it is supported. It is further an important characteristic of a picking cart that it support the crate in proper position, to facilitate the packing of the crate with the picked berries.

Still further, it is important that the cart be so balanced as to prevent the imposition of excessive weight on the ground wheel, when the cart is being moved, to provide a further means adapted to prevent the ground wheel from sinking too deeply into the supporting surface.

The main object of the present invention is to provide a generally improved picking cart, which will have all the characteristics noted above.

Another object of importance is to provide a cart of the character referred to which can be lifted bodily, with its associated crate, when necessary, and to this end, the cart which I have devised is formed as a skeleton framework, composed throughout of light material.

Yet another object is to provide a picking cart of the character referred to wherein the cart will be composed of a minimum of parts, so arranged as to permit the manufacture of the cart at a relatively low cost, the cart being formed entirely from ordinary bar or rod stock, with the exception, of course, of the ground wheel, the several rod-like parts of the cart being readily welded or otherwise fixedly connected to one another at a minimum of locations.

Other objects will appear from the following description, the claims appended thereto, and from the annexed drawing, in which like reference characters designate like parts throughout the several views, and wherein:

Figure 1 is a perspective view of a picking cart formed in accordance with the present invention;

Figure 2 is an enlarged top plan view; and

Figure 3 is a side elevational view, a crate being shown in dotted lines.

Referring to the drawings in detail, the improved picking cart includes a main frame designated generally by the reference numeral 10. The main frame is formed from a single length of flat bar stock, bent to shape, to provide an elongated, straight, body portion 12 intermediate the opposite ends of the length of bar material from which the main frame is formed. The body portion 12 is integrally formed, at one end thereof, with an upstanding end portion 14 merging, at its upper end, into a horizontally disposed handle extension 16 to which is welded or otherwise fixedly secured the mid length portion of a transversely disposed handle bar 18.

As will be noted from Figure 3, the body portion 12 is inclined slightly from the horizontal, said body portion extending downwardly toward the rear end of the cart, that is, that end disposed at the right in Figure 3. The end portion 14, however, is vertically positioned, and thus is disposed at an acute angle relative to the body portion 12.

Carried by the body portion 12, at that end thereof on which the end portion 14 is formed, is a rear crate rest 20, said crate rest being formed from a single length of rod material bent to shape.

The length of the rod material is formed with a relatively elongated, straight cross bar 22 disposed normally to the longitudinal center line of the body portion 12 (Figure 2), the mid length portion of said cross bar being welded or otherwise fixedly attached to the body portion. At its opposite ends, the cross bar 22 merges into rearwardly extended end portions 24, said end portions 24 being inclined correspondingly to the body portion 12, as may be readily noted from Figure 3. At their rear ends, the end portions 24 are merged into upstanding, vertically disposed abutments 26 adapted to engage the adjacent end wall of a supported crate C.

A frame rest has been designated generally by the reference numeral 28, and provides a support for the rear end of the main frame 10. The frame rest 28 is formed from a single length of rod material bent to shape, and includes a cross member 30 disposed throughout its length in longitudinal contact with the cross bar 22 of the crate rest 20. The cross member 30, however, is shorter than the cross bar 22, as will be seen from Figure 2.

At its opposite ends, the cross member 30 is integral with depending support legs 32, said support legs being vertically disposed and merging, at their lower ends, into rearwardly diverging, relatively short, feet 34. The feet 34 prevent the lower ends of the support legs 32 from engaging or becoming entangled with an obstruction, and further discharge the function of preventing the lower ends of the support legs 32 from sinking too deeply into a supporting surface.

A front crate rest has been designated generally by the reference numeral 36, and is mounted upon the front end portion of the main frame. The front crate rest is formed from a single length of rod material shaped to include a straight cross bar 38 welded medially between its ends to the body portion 12, and merging at its ends into forwardly projecting end portions 40 inclined correspondingly to body portion 12. The end portions 40 are merged into upwardly extending abutments 42 adapted to engage the front end wall of the crate C, thus to cooperate with the abutments 26 in holding the crate in a proper position upon the main frame.

At its front end, the body portion 12 of the main frame is integral with a vertically disposed, upwardly extending front end portion 44, integral at its upper end with a forwardly projecting, horizontally disposed handle extension 46 having rigidly secured thereto a handle bar 48.

It will be appreciated that the handle bars 18, 48 can be readily gripped, to permit the entire cart to be lifted bodily whenever necessary.

A yoke 50 is provided, at the front end of the main frame, said yoke being of U-shaped formation, and having a bight fixedly attached to the lower end of the end portion 44. Integral with the bight are parallel legs inclined downwardly and forwardly from the main frame, and formed with openings at their free ends receiving the opposite ends of a shaft 52 on which a ground wheel 54 is rotatably mounted.

The particular formation of the yoke 50, and its disposition relative to the remaining parts of the cart, is such as to cause the ground wheel to be so located as to prevent the ground wheel from assuming an excessive amount of weight, when the cart is being moved. In other words, when the handle bar 18 is grasped and the rear end of the cart lifted, a substantial part of the weight will be imposed upon the body portion 12 of the main frame, rather than directly on the ground wheel 54. Thus, the ground wheel is prevented from sinking too deeply into a supporting surface.

This construction also serves another important purpose, in that it permits the front end of the body portion to be swung upwardly from the position in which it is shown in Figure 2, thus to clear opposite sides of a ditch in which the cart is being moved.

The construction illustrated and described is such as to cause the crate C to be disposed in close proximity to the ground, so as to be readily accessible to the picker. Furthermore, the picker packs the berries from the rear end of the cart, and it will be noted that the crate is so inclined as to facilitate the packing of the berries therein.

It is also considered to be an important characteristic of the invention that the picking cart is of the skeleton framework type, thus to reduce measurably the weight of the cart and permit the cart and the crate to be carried bodily, whenever necessary. At the same time, the cart is so formed as to dispose the crate C close to the ground, while yet keeping the crate from interfering with or being interfered with by the sides of the ditch through which a cart is being moved.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out such principles, it being considered that the invention comprehends any minor change in construction that may be permitted within the scope of the appended claims.

What is claimed is:

1. A picking cart comprising a frame formed of a strip of flat bar material which includes upstanding portions and a body portion extending between the lower ends thereof, a ground wheel supporting one end of said strip, spaced support legs supporting the other end of said strip at a height less than the height at which said one end is supported to impart an inclination to said body portion, and a horizontally disposed crate rest extending transversely of said strip adjacent each of said end portions and each fixedly attached intermediate its ends to said strip, said rests cooperating with each other to support a crate therebetween, each of said rests embodying a rod with means at each end adapted to engage a corner of a crate when supported between said rests.

2. A picking cart comprising a U-shaped main frame formed of a strip of bar material including upstanding end portions connected by a body portion extending between the lower ends of said end portions, each of said end portions having a horizontally disposed handle extension at its upper end, a handle bar transversely disposed and secured intermediate its ends to said extension, a ground wheel supporting one end of said body portion, spaced support legs supporting the other end of said body portion, and a horizontally disposed crate rest extending transversely of said body portion adjacent each of said ends and each fixedly attached intermediate its ends to said body portion, said rests cooperating with each other to support a crate therebetween, each of said rests embodying a rod with means at each end adapted to engage a corner of a crate when supported between said rests.

References Cited in the file of this patent

UNITED STATES PATENTS

| Number | Name | Date |
| --- | --- | --- |
| 689,932 | Tucker | Dec. 31, 1901 |
| 1,393,876 | Wright | Oct. 18, 1921 |
| 1,459,898 | Mulvihill | June 26, 1923 |
| 2,035,535 | Colmorgen | Mar. 31, 1936 |
| 2,578,793 | Fujita | Dec. 18, 1951 |

FOREIGN PATENTS

| Number | Country | Date |
| --- | --- | --- |
| 336,118 | Great Britain | Oct. 9, 1930 |
| 588,772 | Great Britain | June 3, 1947 |